US006959182B2

(12) United States Patent
Lingafeldt et al.

(10) Patent No.: US 6,959,182 B2
(45) Date of Patent: Oct. 25, 2005

(54) METHODS, SYSTEMS AND COMPUTER PROGRAM PRODUCTS FOR COLLECTING TELEMETRY DATA FROM A MOBILE TERMINAL

(75) Inventors: Darren Lingafeldt, Denver, NC (US); Brian Esque, Cary, NC (US)

(73) Assignee: Sony Ericsson Mobile Communications AB (SE)

( * ) Notice: Subject to any disclaimer, the term of this patent is extended or adjusted under 35 U.S.C. 154(b) by 459 days.

(21) Appl. No.: 10/222,520

(22) Filed: Aug. 16, 2002

(65) Prior Publication Data

US 2004/0032340 A1 Feb. 19, 2004

(51) Int. Cl.$^7$ ............................................. H04M 11/00
(52) U.S. Cl. ...................... 455/405; 455/407; 455/418; 379/111
(58) Field of Search ....................... 340/870.02, 870.07; 379/111, 114.01, 100.06; 455/405, 407, 418, 414.3

(56) References Cited

U.S. PATENT DOCUMENTS 5,684,861 A * 11/1997 Lewis et al. ................. 455/405

FOREIGN PATENT DOCUMENTS

| EP | 1 182 896 A1 | 2/2002 | ............ H04Q/7/34 |
| EP | 1 307 037 | 5/2003 | ............ H04M/3/42 |
| GB | 2 327 175 A | 1/1999 | ............ H04Q/7/22 |
| WO | WO 98/17045 | 4/1998 | ............ H04M/1/00 |
| WO | WO 00/67507 | 11/2000 | ............ H04Q/7/34 |
| WO | WO03/007513 A2 * | 7/2002 | ............ H04B/17/00 |

OTHER PUBLICATIONS

Ekhed, Magnus et al., "Distributed Telecommunications Network Access Using the TMOS IntraWeb Gateway," *Ericsson Review*, No. 3, 1997, pp. 130–134.
PCT International Search Report, PCT/US03/24757, mailed May 25,2004.

* cited by examiner

*Primary Examiner*—Timothy Edwards, Jr.
(74) *Attorney, Agent, or Firm*—Myers Bigel Sibley & Sajovec

(57) ABSTRACT

The present invention provides methods, systems and computer program products for collecting telemetry data from a mobile terminal. A feature use circuit is provided that obtains telemetry data based on the usage of features of the mobile terminal. The obtained telemetry data is stored in the mobile terminal. The mobile terminal is connected to at least one of a telemetry enabled website and a base station and transmits the obtained telemetry data to at least one of the telemetry enabled website and the base station.

72 Claims, 4 Drawing Sheets

METHODS, SYSTEMS AND COMPUTER PROGRAM PRODUCTS FOR COLLECTING TELEMETRY DATA FROM A MOBILE TERMINAL

BACKGROUND OF THE INVENTION

The present invention relates to wireless communications and related devices, and, more particularly, to methods systems and computer program products for collecting telemetry data.

As the popularity of mobile terminals increases, manufacturers of these devices strive to provide popular models to increase sales to the marketplace. The most popular models of mobile terminals are sometimes feature intensive. These features may include, for example, multiple ring tones and touch tones, one touch dialing, voice activated dialing, calculators, games, calendars, address books and the like. The more feature intensive the mobile terminal, the more complicated the menus used to access and/or utilize the features become. Furthermore, the memory and programming capabilities required to provide these features may become burdensome.

Attempts to determine which features mobile users access the most, typically include such things as mall surveys or comment cards filled out when mobile terminals and/or accessories are purchased. This information may not be abundant due, for example, to the fact that these types of surveys are rarely popular among consumers. Furthermore, the surveys that get completed may be inaccurate. Therefore, this information is not typically reliable enough to use to modify the features of the mobile terminals and the service provided. Accordingly, it is difficult to obtain feedback on the actual field performance of mobile terminals. This feedback may be useful to manufacturers in their decision to continue and/or discontinue different features built into the mobile terminal and may provide useful performance information that service providers could utilize to provide cost effective calling plans.

SUMMARY OF THE INVENTION

Embodiments of the present invention provide methods, systems and computer program products for collecting telemetry data from a mobile terminal. A feature use circuit is provided that obtains telemetry data based on the usage of features of the mobile terminal. The obtained telemetry data is stored in the mobile terminal. The mobile terminal is connected to at least one of a telemetry enabled website and a base station and transmits the obtained telemetry data to at least one of the telemetry enabled website and the base station.

In various embodiments of the present invention, the obtained telemetry data may be obtained during normal operation of the mobile terminal. The obtained telemetry may include feature and performance telemetry data. The types of obtained telemetry data may include at least one of menu access characteristics, memory usage, hours of operation, call time, average transmit power level, average Received Signal Strength Indicator (RSSI), number of channel handoffs, number of contacts, web history list, web bookmarks, number of Short Message Services (SMS) sent and/or received, downloaded applications, number of data calls, revision history, system operator information, location information, hardware revision, software revision, number of stored pictures, accessories used and number of bluetooth discoveries.

In further embodiments of the present invention, the mobile terminal may be a wireless, internet-enabled mobile terminal and may be connected to at least one of the telemetry enabled website and the base station through a wireless data network. The wireless data network may include at least one of Code Division Multiple Access (CDMA), Time Division Multiple Access (TDMA), Global System for Mobile Communication (GSM), General Packet Radio Service (GPRS), Integrated Digital Enhanced Net (iDEN), Cellular Digital Packet Data (CDPD), J Phone, KDDI, Wideband Code Division Multiple Access (WCDMA) and Universal Mobile Telecommunications System (UMTS) network. The telemetry may be transmitted over the wireless data network utilizing a wireless protocol. The wireless protocol may be at least one of HyperText Transfer Protocol (HTTP), Wireless Application Protocol (WAP), SMS and Wireless Markup Language (WML).

In still further embodiments of the present invention, permission may be obtained from a user of the mobile terminal to access telemetry data stored in the mobile terminal. The telemetry data may then be transmitted from the mobile terminal and stored in a compilation memory. Permission may be obtained by enabling an Opt In function of WAP or enabling a mobile terminal upload feature. The telemetry data may be transmited only if the Opt In function or the upload feature is enabled.

In other embodiments of the present invention, the telemetry data may be automatically transmitted responsive to a user browsing the telemetry enabled website or downloading an application from the telemetry enabled website.

In further embodiments of the present invention, the method may further include receiving the transmitted telemetry data at at least one of the telemetry enabled website and the base station. The received telemetry data may be stored in a compilation memory. The stored telemetry data may be analyzed and the features of the mobile terminal may be modified based on the analyzed telemetry data. Features of the mobile terminal may be deleted based on the analyzed telemetry data. Furthermore, short cuts for accessing features of the mobile terminal that are frequently accessed may be provided.

In still further embodiments of the present invention, the method may include receiving the transmitted telemetry data at at least one of the telemetry enabled website and the base station and storing the received telemetry data in a compilation memory. The stored telemetry data may be analyzed and mobile terminal services may be provided to the mobile terminal based on the analyzed telemetry data. For example, existing calling plans of the mobile terminal may be based on the analyzed telemetry data.

DETAILED DESCRIPTION OF THE INVENTION

Figure 1:
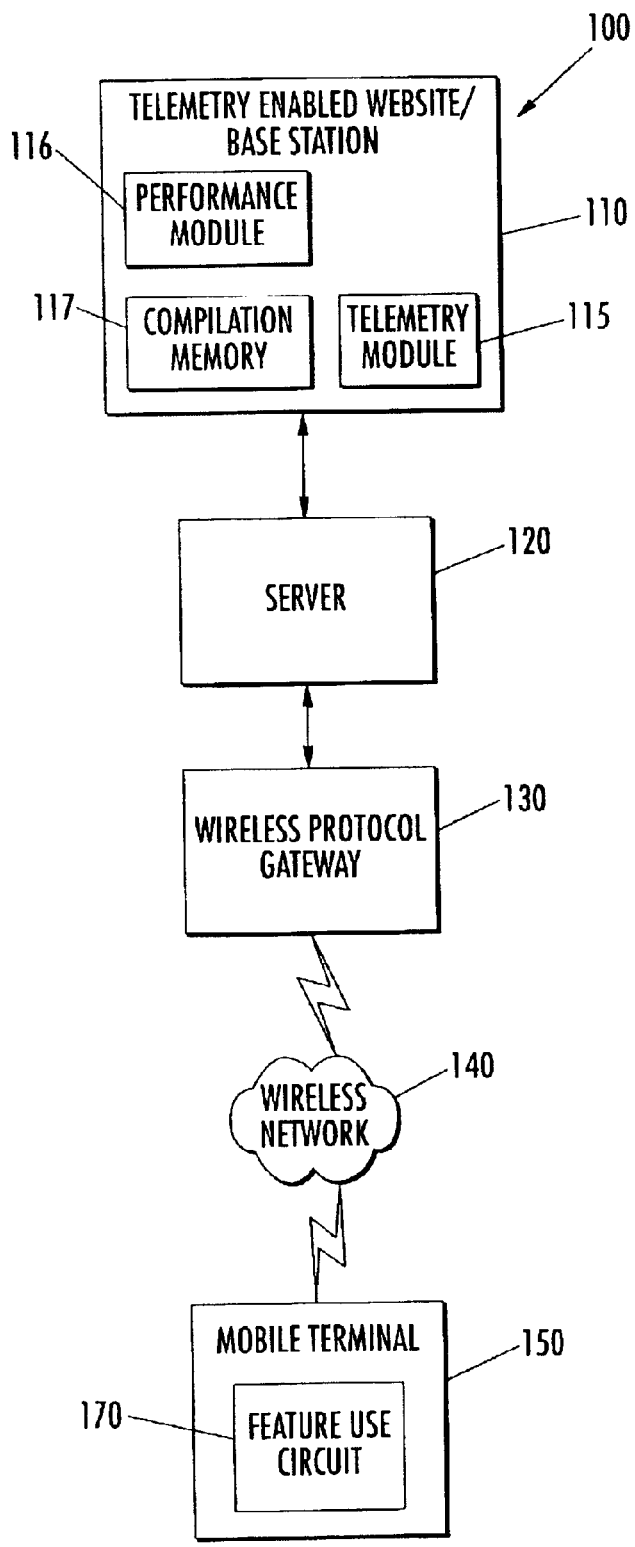
FIG. 1 is a schematic block diagram illustrating embodiments of the present invention illustrated in an exemplary network environment.

The present invention will now be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, system, or computer program product. Accordingly, the present invention may take the form of an entirely hardware embodiment, an entirely software embodiment or an embodiment combining software and hardware aspects, all generally referred to herein as a "circuit." Furthermore, the present invention may take the form of a computer program product on a computer-readable storage medium having computer-readable program code means embodied in the medium. Any suitable computer readable medium may be utilized including hard disks, CD-ROMs, optical storage devices, a transmission media, such as those supporting the Internet or an intranet, or magnetic storage devices.

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package. The processor(s) may be incorporated in a computer coupled to a network that supports wireless communications or in a wireless communications device, such as a wireless terminal. The supported wireless communications may be through a local area network (LAN), a wide area network (WAN), a wireless communication media, a wired communication media or other such internetworking media, or the connection may be made through one or more external computers and/or data processing systems (for example, through the Internet using an Internet Service Provider or through a packet switched or circuit switched network, such as a telephony network).

The present invention is described below with reference to flowchart illustrations and/or block and/or flow diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block and/or flow diagram block or blocks.

These computer program instructions may also be stored in a computer-readable memory that can direct a computer or other programmable processor to function in a particular manner, such that the instructions stored in the computer-readable memory produce an article of manufacture including instruction means which implement the function or act specified in the flowchart and/or block diagram block or blocks.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks.

Embodiments of the present invention will be described further below with reference to FIGS. 1 through 5. Embodiments of the present invention provide method, systems and computer program products for collecting telemetry data from a mobile terminal during mobile terminal operations. In particular, a mobile terminal may store telemetry data based on usage of the mobile terminal. This stored telemetry data may be transmitted from the mobile terminal to a telemetry enabled website and/or a base station when, for example, a user logs onto the website or downloads an application, information, data or the like from the website. This telemetry data may be stored, analyzed and used to provide user preferences to the mobile terminal manufacturers. These preferences may further be used to modify which features are provided in, for example, new phones and/or modify which service plans are provided. Referring now to FIG. 1, a block diagram of embodiments of the present invention implemented in a network environment will be described. The network 100 may include a mobile terminal 150, a wireless network 140, a wireless protocol gateway 130, a server 120 and an Internet enabled website 110. The server 120 may communicate over a wireless network 140 through the wireless protocol gateway 130. The mobile terminal 150 may also communicate over the wireless network 140. Thus, the wireless network 140 may provide a connection between the mobile terminal 150 and the server 120 through the wireless protocol gateway 130. The server 120 may be an applications server, web server or the like.

The network 100, as illustrated in FIG. 1, also includes a website 110. It will be understood that the website 110 may be integrated with the server 120 and the present invention is not limited to the configuration illustrated in FIG. 1. As illustrated in FIG. 1, the website 110 contains a telemetry module 115 according to embodiments of the present invention. The website 110 further includes a compilation memory 117 and a performance module 116. The compilation memory 117 and/or the performance module 116 may be integrated with the telemetry module 115 without departing from the teachings of the present invention.

It will be understood that the present invention is not limited to the embodiments of the present invention illustrated in FIG. 1. For example, the mobile terminal 150 may connect to a base station 24 that is configured to obtain and store telemetry data from the mobile terminal 150. This telemetry data may be accessed by the service providers and manufacturers to improve the devices and systems made available to users.

Figure 2:
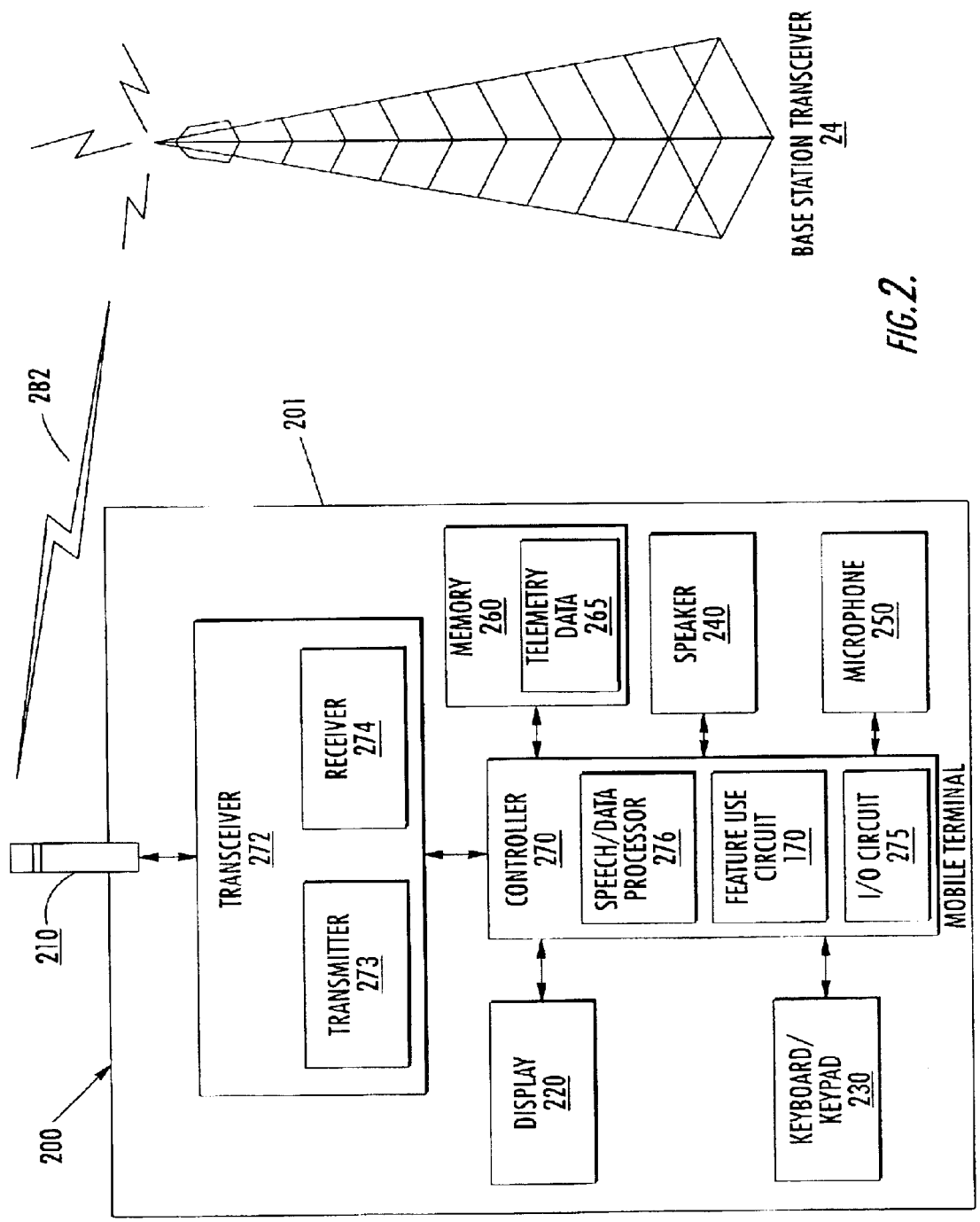
FIG. 2 is a block diagram of a mobile terminal according to embodiments of the present invention.

Embodiments of the present invention will now be further described with reference to the schematic block diagram illustration of a wireless terminal in FIG. 2. FIG. 2 illustrates an exemplary radiotelephone communication system, in accordance with embodiments of the present invention, that includes mobile wireless terminal 200 and a base station transceiver 24. The mobile terminal 200 may comprise, in a portable housing 201, a keyboard/keypad 230, a display 220, a speaker 240, a microphone 250, a transceiver 272, and a memory 260 that communicate with a controller 270.

The transceiver 272, as illustrated, includes a transmitter circuit 273 and a receiver circuit 274, which, respectively, transmit outgoing radio frequency signals to the base station transceiver 24 and receive incoming radio frequency signals from the base station transceiver 24 via an antenna 210. The radio frequency signals transmitted between the mobile terminal 200 and the base station transceiver 24 may comprise both traffic and control signals (e.g., paging signals/messages for incoming calls), which are used to establish and maintain communication with another party or destination. The transceiver 272 may further operate to provide signals from the server to the I/O circuit 275.

Various of the foregoing components of the mobile terminal 200, other than those described further herein, may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

The base station transceiver 24 comprises the radio transceiver(s) that define an individual cell in a cellular network and communicate with the mobile terminal 200 and other mobile terminals in the cell using a radio-link protocol. Although only a single base station transceiver 24 is shown, it will be understood that many base station transceivers may be connected through, for example, a mobile switching center and other devices to define a wireless communication network, for example, wireless network 140 illustrated in FIG. 1.

The controller 270 may include a speech/data processing circuit 276 as well as other functional modules not illustrated in FIG. 2 but which will be understood to those of skill in the art related to wireless communications including both data and voice communication support. As used herein, the speech/data processing circuit 276 may include components such as demodulators, decoders, interleavers and RF processor circuitry. The controller 270, such as a microprocessor, microcontroller or similar data processing device, may execute program instructions stored in a memory 260 of the mobile terminal 200, such as a dynamic random access memory (DRAM), electrically erasable programmable read-only memory (EEPROM) or other storage device.

The transceiver 272, the speech/data processing circuit 276 and other components of the mobile terminal 200 may be implemented using a variety of hardware and software. For example, operations of the transceiver 272 and/or the speech/data processing circuit 276 may be implemented using special-purpose hardware, such as an application specific integrated circuit (ASIC) and programmable logic devices such as gate arrays, and/or software or firmware running on a computing device such as a microprocessor, microcontroller or digital signal processor (DSP). Although functions of the transceiver 272 and the other circuits shown in FIG. 2 may be integrated in a single device, such as a single ASIC microprocessor, they may also be distributed among several devices. Aspects of these circuits may also be combined in one or more devices, such as an ASIC, DSP, microprocessor or microcontroller. These various implementations using hardware, software, or a combination of hardware and software will generally be referred to herein as "circuits."

In accordance with various embodiments of the present invention, a feature use circuit 170 disposed within controller 270 of the mobile terminal 200 is configured to collect telemetry data 265 for the mobile terminal 200. The telemetry data 265 stored in memory 260 is typically collected during normal operation of the mobile terminal 200. The term "normal" as used herein may be used to describe the daily use of a mobile terminal by a user. For example, normal operation may include phone calls initiated and received, menu items accessed, games played, number of new phone numbers entered, calender items added and the like. The telemetry data 265 collected may include feature telemetry data, for example, ring tones, or performance telemetry data, for example, signal strength. In other words, the feature use circuit 170 collects information with respect to preferences/usages of the individual mobile terminal, for example, how long is an average call of the user, what time of day does the user typically make phone calls, which menu options does the user routinely access and the like.

Telemetry data 265 may include any of the following: menu access characteristics, memory usage, hours of operation, call time, average transmit power level, average Received Signal Strength Indicator (RSSI), number of channel handoffs, number of contacts, web history list, web bookmarks, number of SMS sent and/or received, downloaded applications, number of data calls, revision history, system operator information, location information, hardware revision, software revision, number of stored pictures, accessories used and number of bluetooth discoveries and the like. It will be understood that the feature use circuit 170 may be configured to track any one of these parameters individually or any combination thereof. Furthermore, the present invention is not intended to be limited by the above list, but is intended to include any feature or measure of performance that may provide insight into user preferences or mobile terminal options.

Menu access characteristics may include information pertaining to menu options accessed by the user of the mobile terminal and how often these menu options were accessed. Memory usage may be represented in a percentage of total memory in use. Hours of operation may include the total amount of time the mobile terminal has been in operation since it was purchased and/or another suitable reference point. Call time may include the total amount of time the mobile terminal has been in engaged in a call or connected to the network. Average transmit power level may include the average power level produced by the power amplifier of the mobile terminal. Average RSSI may include the average signal level received by the mobile terminal. Number of channel handoffs may include both the number of successful as well as unsuccessful channel handoffs. Number of contacts may include the total number of personal contacts a user has stored in the memory 260 of the mobile terminal 200. Web history list may include the number and identity of websites visited. Web bookmarks may include the number of bookmarks stored in memory. Number of SMS sent/received may include a count of SMS messages. Downloaded applications may include a list of the names and/or types of applications downloaded to the mobile terminal 200. The number of data calls may include the number of data and/or internet connections that were originated by the user of the mobile terminal 200. Revision history may include a list of hardware and software revisions in the mobile terminal 200 including repair or reflash information. System operator information may include informnation describing which wireless service provider is used by the mobile terminal 200 and wireless system identification information. Location information may include last known location of the mobile terminal 200 and/or places from which or to which calls have been made by the mobile terminal 200. Hardware and Software revisions may include hardware and software revisions of the mobile terminal 200. The telemetry information could also include number of pictures stored on the mobile terminal 200 if the mobile terminal 200 is configured to store or take pictures. Telemetry data may further include the number and type of accessories used in conjunction with the mobile terminal 200. Finally the telemetry data could include a count on the number of bluetooth discoveries in which the mobile terminal 200 was involved.

This telemetry data 265 may be, for example, useful in providing improved service to mobile terminal users. For example, the telemetry data 265 collected may provide the manufacturers of mobile terminals with a list of menu options most accessed by users and this list may be used to make these particular menu items easier to access in, for example, new mobile terminals. Others of the statistics included in the telemetry data 265 may be useful in determining lifecycle statistics of particular brands models, or parts of mobile terminals. Still others of the statistics included in the telemetry data 265 could be useful in determining the effectiveness of new technology provided in the network infrastructure. Finally, the user parameters with respect to amount of use, time of day, part of the country and the like may be useful in providing better service plans to the user. These examples are intended for exemplary purposes only and should not be construed as limiting the present invention.

Once the feature use circuit 170 begins to collect telemetry data 265 on the individual mobile terminals, a user can connect to a telemetry enabled website 110 to provide the collected telemetry data 265 to the manufacturers. Alternatively, the telemetry data 265 may be sent to a base station 24 where it may be stored and analyzed in the same way as discussed with respect to the telemetry enabled website 110. The telemetry enabled website 110 may be a website that contains new mobile terminal features that can be downloaded onto the mobile terminal 200. When a user logs onto the telemetry enabled website 110, the website 110 may automatically begin to upload the telemetry data 265 compiled by the feature use circuit 270 stored in the mobile terminal 200. Alternatively, the website 110 may wait for the user to download a feature and/or program from the website before beginning the transfer of the telemetry data 265 from the mobile terminal 200 to the compilation memory 117 of the telemetry enabled website 110.

Privacy issues may be a concern with respect to automatic or unauthorized uploads from a mobile terminal, thus, privacy issues may be addressed. For example, a user may be prompted before downloading a "free" feature onto the mobile terminal 200 and the user may be required to grant access to the telemetry data 265 before receiving the "free" feature or program. Alternatively, the feature use circuit 170 may be disabled at the mobile terminal 200 by a user. Privacy issues and solutions thereto will be discussed further below.

As discussed above, the telemetry enabled website 110 may upload and store the telemetry data 265 in the compilation memory 117 of the website 110. The compilation memory 117 may be configured to store multiple lists of telemetry data 265 from various mobile terminals. The data in the compilation memory 117 may be analyzed to provide information that may be used to modify features and/or service of the mobile terminal. The data may be analyzed and used to modify features and/or services of the mobile terminal by, for example, the performance module 116 illustrated in FIG. 1.

Figure 3:
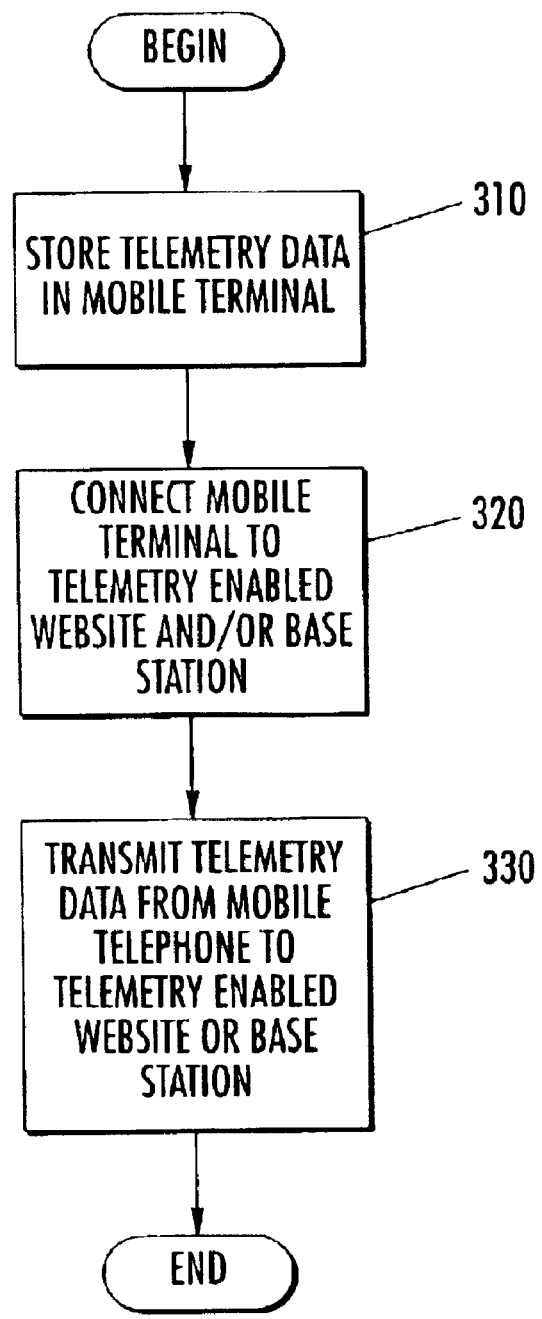
FIG. 3 is a flow chart illustrating operations for collecting telemetry data from a mobile terminal according to embodiments of the present invention.
Figure 4:
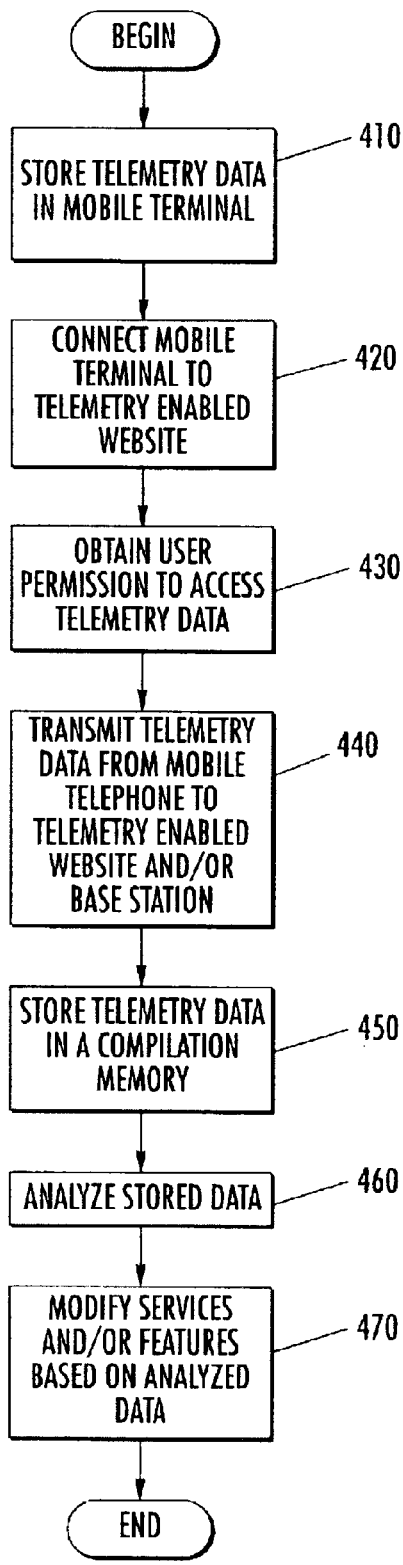
FIG. 4 is a flow chart illustrating operations for collecting telemetry data from a mobile terminal according to further embodiments of the present invention.
Figure 5:
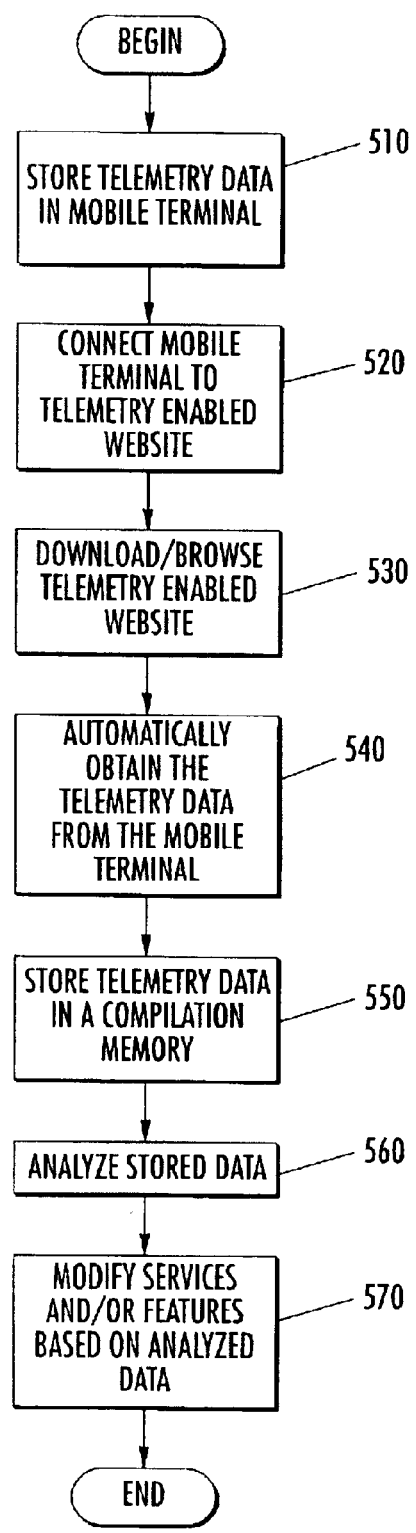
FIG. 5 is a flow chart illustrating operations for collecting telemetry data from a mobile terminal according to still further embodiments of the present invention.

Operations according to embodiments of the present invention will now be discussed with respect to FIGS. 3 through 5. FIGS. 3 through 5 are flowchart illustrations of operations that may be carried out by the mobile terminal 200 according to embodiments of the present invention. Referring to FIG. 3, operations for collecting telemetry data from a mobile terminal 200 will be discussed. A feature use circuit 170 in a mobile terminal 200 is configured to store telemetry data 265 during normal operation of the mobile terminal 200 (block 310). As discussed above, the term "normal" as used herein may be used to describe the daily use of a mobile terminal by a user. For example, normal operation may include phone calls initiated and received, menu items accessed, games played, number of new phone numbers entered, calendar items added and the like.

The mobile terminal 200 may be Internet enabled, for example, a web phone. At some point, the mobile terminal 200 is connected to a telemetry enabled website 110 (block 320). The mobile terminal 200 may, alternatively, connect to a base station 24 and the telemetry data 265 may be provided to the base station. The internet enabled mobile terminal 200 may communicate with the internet website 110 via a wireless network 140. Such data networks 140 may be, for example, code division multiple access (CDMA), time division multiple access (TDMA), Global System for Mobile Communication (GSM), General Packet Radio Service (GPRS), Integrated Digital Enhanced Net (iDEN), Cellular Digital Packet Data (CDPD), J Phone, KDDI, Wideband Code Division Multiple Access (WCDMA) and Universal Mobile Telecommunications System (UMTS) network or the like. Communication over the network 140 may be accomplished using a wireless access protocol through a wireless protocol gateway 130. Exemplary wireless access protocols may include HyperText Transfer Protocol (HTTP), Wireless Application Protocol (WAP), SMS and Wireless Markup Language (WML) or any combination thereof, but may be any wireless protocol known to those skilled in the art.

When the mobile terminal 200 connects to the telemetry enabled website, the telemetry data generated by the feature use circuit 170 stored in the mobile terminal is transmitted to the telemetry enabled website 110 and/or the base station 24(block 330). Methods of obtaining the data from the wireless mobile terminal 200 will be discussed further below.

FIG. 4 is a flow chart illustrating operations according to further embodiments of the present invention. Operations corresponding to blocks 410 and 420 of FIG. 4 are similar to those operations discussed with respect to blocks 310 and 320 of FIG. 3, thus, no further description of these operations will be provided. Once the mobile terminal 200 has a connection with the telemetry enabled website 110 and/or the base station 24, permission may be obtained from a user of the mobile terminal 200 before any telemetry data is exchanged between the mobile terminal 200 and the telemetry enabled website 110 and/or the base station 24 (block 430). For example, permission may be granted by providing immediate disclosure of the intent to upload the telemetry data 265 when the user logs on to the telemetry enabled website 110. For example, a user may be asked if the upload of the telemetry data 265 can take place and may be provided with a choice of Yes or No. If the user chooses Yes, the telemetry enabled website 110 may then upload the telemetry data 265 generated by the feature use circuit 170. If the user clicks no, the user may not be allowed access to the website 110 or may be allowed to browse the website 110, but not download anything.

Permission may further be granted or denied by using a mobile terminal setting. For example, a telemetry upload function of the feature use circuit 170 may be configured to be enabled or disabled by a menu option. If the user does not want to participate in gathering telemetry data, the user can disable the feature use circuit 170. The telemetry enabled website 110 may be configured to detect that this function has been disabled and either deny entry or allow limited access to the website 110. On the other hand, if the user has enabled the telemetry upload function of the feature use circuit 170 the user may utilize the website for its intended purpose while the telemetry enabled website 110 uploads the telemetry data 265 from the mobile terminal 200.

Permission may still further be granted by using an "Opt In" function that is part of the Wireless Access Protocol (WAP). The user enables the function, or in other words, opts in, and is able to fully use the website 110. The telemetry enabled website 110 may be configured to detect whether or not the opt in function has been enabled or disabled. The results of each of these actions would be the same as discussed above with respect to enabling/disabling the feature use circuit 170.

Once user permission has been obtained (block 430), the mobile terminal 200 may transmit the collected telemetry data 265 to the telemetry enabled website 110 (block 440). The telemetry module 115, discussed above with respect to FIG. 1, may be configured to receive, i.e. upload, the telemetry data 265 and store the telemetry data 265 so that it can be utilized (block 450). The storing of telemetry data may be repeated for each mobile terminal that connects to the telemetry enabled website. Thus, more than one mobile terminal's data may be stored in the compilation memory 117 of the telemetry enabled website 110. The more users that participate, the more accurate the results of the sampling may be. The data stored in the compilation memory 117 corresponding to each of the mobile terminals that connected to the website 110 may be analyzed (block 460). The resulting information may be used to modify services offered by the service provider, features provided in the mobile terminal and the like (block 470). The telemetry data 265 may be analyzed and used to modify the features and/or services provided to the mobile terminal by, for example, the performance module 116 illustrated in FIG. 1.

For example, if it is concluded that several features provided on the mobile terminal 200 are scarcely used by any mobile terminal user, these features may be deleted or put on a low-priority menu. On the other hand, if it is determined that some features are used by numerous mobile terminal users, these features may be made more accessible and prominent. For example, a short cut may be created on the mobile terminal just to access the often-used features. If it is determined that a sector of the mobile terminal users use their mobile terminals at odd hours, for example, 1 to 4 AM, a special calling plan may be provided for such users.

Referring to FIG. 5, operations according to embodiments of the present invention will be discussed. Operations corresponding to blocks 510 and 520 of FIG. 5 are similar to those operations discussed with respect to blocks 310 and 320 of FIG. 3, thus, no further description of these operations will be provided. Once the mobile terminal 200 has a connection with the telemetry enabled website 110 and begins browsing or downloading programs from the telemetry enabled website 110 (block 530), the telemetry data 265 gathered by the feature use circuit 170 of the mobile terminal may be automatically transmitted from the mobile terminal 200 to the compilation memory 117 of the telemetry enabled website 110 (block 540). Thus, the automatic upload may be responsive to the user logging onto the website 110 and browsing or by a download requested by the user. In these cases, the user has not been asked permission to access the mobile terminal 200. Unless the user has disabled the function, the telemetry data 265 will be transmitted from the mobile terminal 200 to the telemetry enabled website 110 and/or base station 24. This method of obtaining data may trigger privacy issues that are addressed by embodiments of the present invention discussed above with respect to FIG. 4.

As discussed above, the telemetry module 115 may be configured to upload the telemetry data 265 and store the telemetry data so that it can be utilized (block 550). The data stored in the compilation memory 117 corresponding to each of the mobile terminals that connected to the website 110 is analyzed (block 560). The resulting information may be used to modify services offered by the service provider, features provided in new mobile terminal and the like (block 570).

As discussed above, telemetry data collected by a circuit 170 in the mobile terminal 200 and shared with a telemetry enabled website 100 and/or base station 24 may be used, for example, to improve the quality of equipment and services provided to mobile terminal users. The flowcharts, flow diagrams and block diagrams of FIGS. 1 through 5 illustrate the architecture, functionality, and operation of possible implementations of systems, methods and computer program products for collecting telemetry data. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method for collecting telemetry data from a mobile terminal, comprising:

obtaining telemetry data based on the usage of features of the mobile terminal;

storing the obtained telemetry data in the mobile terminal;

connecting the mobile terminal to at least one of a telemetry enabled website and a base station;

obtaining permission from a user of the mobile terminal to access the stored telemetry data; and transmitting the stored telemetry data to the at least one of the telemetry enabled website and the base station if permission is obtained.

2. A method according to claim 1, wherein storing the obtained telemetry data comprises storing the obtained telemetry data during normal operation of the mobile terminal.

3. A method according to claim 1, further comprising browsing the telemetry enabled website, wherein transmitting telemetry data comprises automatically transmitting the telemetry data responsive to browsing the telemetry enabled website.

4. A method according to claim 1, further comprising downloading an application from the telemetry enabled website, wherein transmitting the telemetry data comprises automatically transmitting the telemetry data responsive to downloading the application from the telemetry enabled website.

5. A method according to claim 1, wherein the method further comprises:
receiving the transmitted telemetry data at the at least one of the telemetry enabled website and the base station;
storing the received telemetry data in a compilation memory;
analyzing the stored telemetry data; and
modifying mobile terminal services provided to the mobile terminal based on the analyzed telemetry data.

6. A method according to claim 5, wherein modifying mobile terminal services comprises modifying existing calling plans based on the analyzed telemetry data.

7. A method according to claim 1, wherein storing the obtained telemetry data comprises storing feature and performance telemetry data.

8. A method according to claim 7 wherein the obtained telemetry data comprises at least one of menu access characteristics, memory usage, hours of operation, call time, average transmit power level, average Received Signal Strength Indicator (RSSI), number of channel handoffs, number of contacts, web history list, web bookmarks, number of Short Message Services (SMS) sent and/or received, downloaded applications, number of data calls, revision history, system operator information, location information, hardware revision, software revision, number of stored pictures, accessories used and number of bluetooth discoveries.

9. A method according to claim 1, wherein transmitting telemetry data further comprises:
receiving the telemetry data transmitted from the mobile terminal; and
storing the received telemetry data in a compilation memory of the telemetry enabled website or the base station.

10. A method according to claim 9, wherein transmitting the telemetry data further comprises transmitting the telemetry data over a wireless data network utilizing a wireless protocol.

11. A method according to claim 1, wherein the method further comprises:
receiving the transmitted telemetry data at the at least one of the telemetry enabled website and the base station;
storing the received telemetry data in a compilation memory of the at least one telemetry enabled website and the base station;
analyzing the stored telemetry data; and
modifying the features of the mobile terminal based on the analyzed telemetry data.

12. A method according to claim 11, wherein modifying the features of the mobile terminal based on the analyzed telemetry data comprises deleting features from a list of features provided.

13. A method according to claim 11, wherein modifying the features of the mobile terminal based on the analyzed data comprises providing short cuts for accessing features of the mobile terminal that are frequently accessed.

14. A method according to claim 1, wherein the mobile terminal comprises a wireless, internet-enabled mobile terminal and wherein connecting the mobile terminal to a telemetry enabled website comprises connecting the mobile terminal to the telemetry enabled website through a wireless data network.

15. A method according to claim 14, wherein the wireless data network comprises at least one of Code Division Multiple Access (CDMA), Time Division Multiple Access (TDMA), Global System for Mobile Communication (GSM). General Packet Radio Service (GPRS), Integrated Digital Enhanced Net (iDEN), Cellular Digital Packet Data (CDPD), J Phone, KDDI, Wideband Code Division Multiple Access (WCDMA) and Universal Mobile Telecommunications System (UMTS).

16. A method according to claim 14, wherein transmitting the telemetry data further comprises transmitting the telemetry data over the wireless data network utilizing a wireless protocol.

17. A method according to claim 16, wherein the wireless protocol comprises at least one of HyperText Transfer Protocol (HTTP), Wireless Application Protocol (WAP), SMS and Wireless Markup Language (WML).

18. A method for collecting telemetry data from a mobile terminal, comprising:
obtaining, at the mobile terminal, telemetry data based on the usage of features of the mobile terminal;
storing the obtained telemetry data in the mobile terminal;
obtaining permission from a user of the mobile terminal to access the telemetry data stored in the mobile terminal;
receiving the telemetry data at at least one of a telemetry enabled website and a base station if permission is obtained;
storing the received telemetry data in a compilation memory at the at least one of the telemetry enabled website and the base station;
analyzing the stored telemetry data; and
modifying features and/or services of the mobile terminal based on the analyzed telemetry data.

19. A method according to claim 18, further comprising:
obtaining at the mobile terminal, the telemetry data based on the usage of features of the mobile terminal;
storing the obtained telemetry data in the mobile terminal;
wirelessly connecting the mobile terminal to the at least one of the telemetry enabled website and the base station; and
transmitting the obtained telemetry data to at least one of the telemetry enabled website and the base station.

20. A method according to claim 19, wherein transmitting telemetry data further comprises:
receiving the telemetry data transmitted from the mobile terminal; and
storing the received telemetry data in a compilation memory at the telemetry enabled website or the base station.

21. A method according to claim 19, further comprising browsing the telemetry enabled website, wherein transmitting telemetry data comprises automatically transmitting the telemetry data responsive to browsing the telemetry enabled website.

22. A method according to claim 19, further comprising downloading an application from the telemetry enabled website, wherein transmitting the telemetry data comprises automatically transmitting the telemetry data responsive to downloading the application from the telemetry enabled website.

23. A method according to claim 19, wherein modifying the features of the mobile terminal based on the analyzed telemetry data comprises deleting features from a list of features provided.

24. A method according to claim 19, wherein modifying the features of the mobile terminal based on the analyzed data comprises providing short cuts for accessing features of the mobile terminal that are frequently accessed.

25. A method according to claim 19, wherein modifying mobile terminal services comprises modifying existing calling plans based on the analyzed telemetry data.

26. A method according to claim 19, wherein the telemetry data comprises at least one of menu access characteristics, memory usage, hours of operation, call time, average transmit power level, average Received Signal Strength Indicator (RSSI), number of channel handoffs, number of contacts, web history list, web bookmarks, number of SMS sent and/or received, downloaded applications, number of data calls, revision history, system operator information, location information, hardware revision, software revision, number of stored pictures, accessories used and number of bluetooth discoveries.

27. A method according to claim 19, wherein the mobile terminal comprises a wireless, internet-enabled mobile terminal and wherein connecting the mobile terminal to a telemetry enabled website comprises connecting the mobile terminal to the telemetry enabled website through a wireless data network.

28. A method according to claim 27, wherein the wireless data network comprises at least one of CDMA, TDMA, GSM, GPRS, iDEN, CDPD, J Phone, KDDI, WCDMA and UMTS.

29. A method according to claim 28, wherein transmitting the telemetry data further comprises transmitting the telemetry data over the wireless data network utilizing a wireless protocol.

30. A method according to claim 29, wherein the wireless protocol comprises at least one of HTTP, WAP, SMS and WML.

31. A system for collecting telemetry data from a mobile terminal, comprising:
   a feature use circuit in the mobile terminal configured to obtain telemetry data based on the usage of features of the mobile terminal;
   a mobile terminal memory in the mobile terminal configured to store the obtained telemetry data;
   a wireless transceiver in the mobile terminal configured to connect the mobile terminal to at least one of a telemetry enabled website and a base station and to transmit telemetry data to the at least one of the telemetry enabled website and the base station; and
   a telemetry module configured to obtain permission from a user of the mobile terminal to access the transmitted telemetry data and to receive the transmitted telemetry data at the at least the telemetry enabled website and the base station if permission is obtained.

32. A system according to claim 31, wherein the feature use circuit is further configured to store the obtained telemetry data during normal operation of the mobile terminal.

33. A system according to claim 31, wherein the telemetry module is further configured to automatically obtain the received telemetry data from the mobile terminal responsive to browsing the telemetry enabled website.

34. A system according to claim 31, wherein the telemetry module is further configured to automatically obtain the received telemetry data from the mobile terminal responsive to downloading an application from the telemetry enabled website.

35. A system according to claim 31, wherein the feature use circuit is further configured to store feature and performance telemetry data.

36. A system according to claim 35, wherein the telemetry data comprises at least one of menu access characteristics, memory usage, hours of operation, call time, average transmit power level, average Received Signal Strength Indicator (RSSI), number of channel handoffs, number of contacts, web history list, web bookmarks, number of SMS sent and/or received, downloaded applications, number of data calls, revision history, system operator information, location information, hardware revision, software revision, number of stored pictures, accessories used and bluetooth discoveries.

37. A system according to claim 31, wherein the system further comprises:
   at least one of a telemetry enabled website or a base station configured to receive the transmitted telemetry data from the mobile terminal;
   a compilation memory configured to store the received telemetry data obtained from the mobile terminal; and
   a performance module configured to analyze the stored telemetry data and modify mobile terminal services provided to the mobile terminal based on the analyzed telemetry data.

38. A system according to claim 37, wherein the performance module is further configured to modify existing calling plans based on the analyzed telemetry data.

39. A system according to claim 31, wherein the system further comprises:
   at least one of a telemetry enabled website or a base station configured to receive the transmitted telemetry data from the mobile terminal;
   a compilation memory configured to store received telemetry data transmitted from the mobile terminal; and
   a performance module configured to analyze the stored telemetry data and modify features of the mobile terminal based on the analyzed telemetry data.

40. A system according to claim 39, wherein the performance module is further configured to delete features from a list of features provided based on the analyzed telemetry data.

41. A system according to claim 39, wherein the performance module is further configured to provide short cuts for accessing features that are frequently accessed.

42. A system according to claim 31, wherein the wireless transceiver is further configured to connect the mobile terminal to the telemetry enabled website through a wireless data network.

43. A system according to claim 42, wherein the wireless data network comprises at least one of CDMA, TDMA, GSM, GPRS, iDEN, CDPD, J Phone, KDDI, WCDMA and UMTS.

44. A system according to claim 42, wherein the wireless transceiver is further configured to connect the mobile terminal to the telemetry enabled website over the wireless data network utilizing a wireless protocol.

45. A system according to claim 44, wherein the wireless protocol comprises at least one of HTTP, WAP, SMS and/or WML.

46. A system for collecting telemetry data from a mobile terminal, comprising:
- means for obtaining telemetry data based on the usage of features of the mobile terminal;
- means for storing the obtained telemetry data in the mobile terminal;
- means for obtaining permision from a user of the mobile terminal to access the stored telemetry data in the mobile terminal;
- means for connecting the mobile terminal to at least one of a telemetry enabled website and a base station; and
- means for transmitting the obtained telemetry data to the at least one of the telemetry enabled website and the base station if permission is obtained.

47. A system according to claim 46, wherein the telemetry data comprises at least one of menu access characteristics, memory usage, hours of operation, call time, average transmit power level, average Received Signal Strength Indicator (RSSI), number of channel handoffs, number of contacts, web history list, web bookmarks, number of SMS sent and/or received, downloaded applications, number of data calls, revision history, system operator information, location information, hardware revision, software revision, number of stored pictures, accessories used and bluetooth discoveries.

48. A system according to claim 46, further comprising means for browsing the telemetry enabled website, wherein means for transmitting telemetry data comprises means for automatically transmitting the telemetry data responsive to browsing the telemetry enabled website.

49. A system according to claim 46, further comprising means for downloading an application from the telemetry enabled website, wherein means for transmitting the telemetry data comprises means for automatically transmitting the telemetry data responsive to downloading the application from the telemetry enabled website.

50. A system according to claim 46, wherein the mobile terminal is further configured to communicate over the wireless internet and wherein the means for connecting the mobile terminal to a telemetry enabled website comprises means for connecting the mobile terminal to the telemetry enabled website through a wireless data network.

51. A system according to claim 50, wherein the wireless data network comprises at least one of CDMA. TDMA, GSM, GPRS, iDEN, CDPD, J Phone, KDDI, WCDMA and UMTS.

52. A system according to claim 46, wherein means for transmitting the telemetry data further comprises means for transmitting the telemetry data over the wireless data network utilizing a wireless protocol.

53. A system according to claim 52, wherein the wireless protocol comprises at least one of HTTP, WAP, SMS and WML.

54. A system according to claim 46, wherein means for transmitting telemetry data further comprises:
- means for receiving the telemetry data transmitted from the mobile terminal; and
- means for storing the received telemetry data in a compilation memory.

55. A system according to claim 54, wherein means for transmitting the telemetry data further comprises means for transmitting the telemetry data over a wireless data network utilizing a wireless protocol.

56. A system according to claim 46, wherein the system further comprises:
- means for receiving the transmitted telemetry data at at least one of the telemetry enabled websize and the base station;
- means for storing the received telemetry data in a compilation memory;
- means for analyzing the stored telemetry data; and
- means for modifying mobile terminal services provided to the mobile terminal based on the analyzed telemetry data.

57. A system according to claim 56, wherein means for modifying mobile terminal services comprises means for modifying existing calling plans based on the analyzed telemetry data.

58. A system according to claim 46, the system further comprises:
- means for receiving the transmitted telemetry data at at least one of the telemetry enabled website and the base station;
- means for storing the received telemetry data in a compilation memory;
- means for analyzing the stored telemetry data; and
- means for modifying the features of the mobile terminal based on the analyzed telemetry data.

59. A system according to claim 58, wherein means for modifying the features of the mobile terminal based on the analyzed telemetry data comprises means for deleting features from a list of features provided.

60. A system according to claim 58, wherein means for modifying the features of the mobile terminal based on the analyzed data comprises means for providing short cuts for accessing features of the mobile terminal that are frequently accessed.

61. A system for collecting telemetry data from a mobile terminal, comprising:
- means for obtaining permission from a user of the mobile terminal to access telemetry data in the mobile terminal;
- means for receiving the telemetry data at least one of a telemetry enabled website and a base station if permission is obtained;
- means for storing the received telemetry data in a compilation memory at the at least one of the telemetry enabled website and the base station;
- means for analyzing the stored telemetry data; and
- means for modifying features and/or services of the mobile terminal based on the analyzed telemetry data.

62. A system according to claim 61, further comprising:
- means for obtaining the telemetry data based on the usage of features of the mobile terminal;
- means for storing the obtained telemetry data in the mobile terminal;
- means for wirelessly connecting the mobile terminal to at least one of a telemetry enabled website and a base station; and
- means for transmitting the obtained telemetry data to at least one of the telemetry enabled website and the base station.

63. A method for collecting telemetry data from a mobile terminal, comprising:
- enabling an Opt In function of WAP;
- obtaining telemetry data based on the usage of features of the mobile terminal;
- storing the obtained telemetry data in the mobile terminal;
- connecting the mobile terminal to at least one of a telemetry enabled website and a base station; and
- transmitting the stored telemetry data to at least one of the telemetry enabled website and the base station, wherein transmitting the telemetry data further comprises transmitting the telemetry data from the mobile terminal only if the Opt In function is enabled.

64. A method for collecting telemetry data from a mobile terminal, comprising:
enabling a mobile terminal telemetry upload feature;
obtaining telemetry data based on the usage of features of the mobile terminal;
storing the obtained telemetry data in the mobile terminal;
connecting the mobile terminal to at least one of a telemetry enabled website and a base station; and
transmitting the stored telemetry data to at least one of the telemetry enabled website and the base station, wherein transmitting telemetry data comprises transmitting the telemetry data from the mobile terminal only if the upload feature is enabled.

65. A method for collecting telemetry data from a mobile terminal, comprising:
enabling an Opt In function of WAP;
obtaining, at the mobile terminal, telemetry data based on the usage of features of the mobile terminal;
storing the obtained telemetry data in the mobile terminal;
wirelessly connecting the mobile terminal to at least one of the telemetry enabled website and the base station;
transmitting the obtained telemetry data to at least one of the telemetry enabled website and the base station, wherein transmitting the telemetry data further comprises transmitting the telemetry data from the mobile terminal only if the Opt In function is enabled;
receiving the transmitted telemetry data at the at least one of the telemetry enabled website and the base station;
storing the received telemetry data in a compilation memory at the at least one of the telemetry enabled website and the base station;
analyzing the stored telemetry data; and
modifying features and/or services of the mobile terminal based on the analyzed telemetry data.

66. A method for collecting telemetry data from a mobile terminal, comprising:
enabling a mobile terminal upload feature;
obtaining, at the mobile terminal, telemetry data based on the usage of features of the mobile terminal;
storing the obtained telemetry data in the mobile terminal;
wirelessly connecting the mobile terminal to at least one of the telemetry enabled website and the base station;
transmitting the obtained telemetry data to at least one of the telemetry enabled website and the base station,, wherein transmitting the telemetry data further comprises transmitting the telemetry data from the mobile terminal only if the upload feature is enabled;
receiving the transmitted telemetry data at the at least one of the telemetry enabled website and the base station;
storing the received telemetry data in a compilation memory at the at least one of the telemetry enabled website and the base station;
analyzing the stored telemetry data; and
modifying features and/or services of the mobile terminal based on the analyzed telemetry data.

67. A system for collecting telemetry data from a mobile terminal, comprising:
a feature use circuit in the mobile terminal configured to obtain telemetry data based on the usage of features of the mobile terminal;
a mobile terminal memory in the mobile terminal configured to store the obtained telemetry data;
a wireless transceiver in the mobile terminal configured to connect the mobile terminal to at least one of a telemetry enabled website and a base station and to transmit telemetry data to the at least one of the telemetry enabled website and the base station, wherein the wireless transceiver is further configured to transmit the telemetry data from the mobile terminal only if an Opt In function of WAP is enabled; and
a telemetry module configured to receive the transmitted telemetry data at the at least one of the telemetry enabled website and the base station.

68. A system for collecting telemetry data from a mobile terminal, comprising:
a feature use circuit in the mobile terminal configured to obtain telemetry data based on the usage of features of the mobile terminal;
a mobile terminal memory in the mobile terminal configured to store the obtained telemetry data;
a wireless transceiver in the mobile terminal configured to connect the mobile terminal to at least one of a telemetry enabled website and a base station and to transmit telemetry data to the at least one of the telemetry enabled website and the base station, wherein the wireless transceiver is further configured to transmit the telemetry data from the mobile terminal only if an mobile terminal upload feature is enabled; and
a telemetry module configured to receive the transmitted telemetry data at the at least one of the telemetry enabled website and the base station.

69. A system for collecting telemetry data from a mobile terminal, comprising:
means for enabling an Opt In function of WAP;
means for obtaining telemetry data based on the usage of features of the mobile terminal;
means for storing the obtained telemetry data in the mobile terminal;
means for connecting the mobile terminal to at least one of a telemetry enabled website and a base station; and
means for transmitting the obtained telemetry data to the at least one of the telemetry enabled website and the base station wherein means for transmitting the telemetry data further comprises means for transmitting the telemetry data from the mobile terminal only if the Opt In function is enabled.

70. A system for collecting telemetry data from a mobile terminal, comprising:
means for enabling a mobile terminal telemetry upload feature;
means for obtaining telemetry data based on the usage of features of the mobile terminal;
means for storing the obtained telemetry data in the mobile terminal;
means for connecting the mobile terminal to at least one of a telemetry enabled website and a base station; and
means for transmitting the obtained telemetry data to the at least one of the telemetry enabled website and the base station, wherein means for transmitting telemetry data comprises means for transmitting the telemetry data from the mobile terminal only if the upload feature is enabled.

71. A computer program product for collecting telemetry data from a mobile terminal, the computer program product comprising:

a computer readable storage medium having computer readable program code embodied in said medium, said computer readable program code comprising:

computer readable program code that obtains telemetry data based on the usage of features of the mobile terminal;

computer readable program code that stores the obtained telemetry data in the mobile terminal;

computer readable program code that connects the mobile terminal to at least one of a telemetry enabled website and a base station;

computer readable program code that obtains permission from a user of the mobile terminal to access the stored telemetry data; and computer readable program code that transmits the stored telemetry data to at least one of the telemetry enabled website and the base station if permission is obtained.

72. A computer program product for collecting telemetry data from a mobile terminal, the computer program product comprising:

a computer readable storage medium having computer readable program code embodied in said medium, said computer readable program code comprising:

computer readable program code that obtains permission from a user of the mobile terminal to access telemetry data in the mobile terminal;

computer readable program code that receives the telemetry data at least one of a telemetry enabled website and a base station if permission is obtained;

computer readable program code that stores the received telemetry data in a compilation memory at the at least one of the telemetry enabled website and the base station;

computer readable program code that analyzes the stored telemetry data; and computer readable program code that modifies features and/or services of the mobile terminal based on the analyzed telemetry data.

* * * * *

UNITED STATES PATENT AND TRADEMARK OFFICE
CERTIFICATE OF CORRECTION

PATENT NO. : 6,959,182 B2
DATED : October 25, 2005
INVENTOR(S) : Lingafeldt et al.

It is certified that error appears in the above-identified patent and that said Letters Patent is hereby corrected as shown below:

<u>Column 12,</u>
Line 37, should read -- receiving the telemetry data at least one of a telemetry --.
Lines 47-49, should be deleted.

<u>Column 16,</u>
Line 11, should read -- 58. A system according to claim 46, wherein the system further --.

Signed and Sealed this

Second Day of May, 2006

JON W. DUDAS
*Director of the United States Patent and Trademark Office*